US011287899B1

(12) United States Patent
Wu et al.

(10) Patent No.: US 11,287,899 B1
(45) Date of Patent: Mar. 29, 2022

(54) KEYBOARD DEVICE WITH PROTECTING FUNCTION AND MANUFACTURING METHOD THEREOF

(71) Applicant: Primax Electronics Ltd., Taipei (TW)

(72) Inventors: Ming-Han Wu, Taipei (TW); Hsien-Tsan Chang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/240,295

(22) Filed: Apr. 26, 2021

(30) Foreign Application Priority Data

Feb. 26, 2021 (TW) .................. 110107030

(51) Int. Cl.
| | |
|---|---|
| *G09G 5/00* | (2006.01) |
| *G06F 3/02* | (2006.01) |
| *H01H 13/06* | (2006.01) |
| *H01H 13/703* | (2006.01) |
| *H01H 13/88* | (2006.01) |
| *H01H 13/86* | (2006.01) |

(52) U.S. Cl.
CPC .......... *G06F 3/0202* (2013.01); *H01H 13/06* (2013.01); *H01H 13/703* (2013.01); *H01H 13/86* (2013.01); *H01H 13/88* (2013.01)

(58) Field of Classification Search
CPC .......... G06F 3/0202; G06F 3/02; G06F 3/033; H01H 13/06; H01H 13/703; H01H 13/86; H01H 13/88; H03K 17/94; H03M 11/00; G09G 5/00; G09G 5/08
See application file for complete search history.

(56) References Cited

U.S. PATENT DOCUMENTS

| | | | | |
|---|---|---|---|---|
| 10,744,593 | B2 * | 8/2020 | Yen .................. | H01H 13/7013 |
| 2014/0166457 | A1 * | 6/2014 | Chen ................. | H01H 13/83 200/5 A |
| 2014/0367238 | A1 * | 12/2014 | Chen ................. | H01H 13/83 200/5 A |
| 2015/0014135 | A1 * | 1/2015 | Ho .................... | H01H 3/125 200/5 A |
| 2015/0014136 | A1 * | 1/2015 | Liang ................ | H01H 13/83 200/5 A |
| 2017/0032909 | A1 * | 2/2017 | Chen ................. | H01H 13/7065 |

* cited by examiner

*Primary Examiner* — Pegeman Karimi
(74) *Attorney, Agent, or Firm* — Kirton McConkie; Evan R. Witt

(57) ABSTRACT

A keyboard device with a protecting function and a manufacturing method of the keyboard device are provided. Firstly, a mold is provided. Then, a frame material is placed into the mold to form a frame body, and a film material is placed into the mold to form a protective film. Consequently, the protective film is fixed on the frame body. After the mold is removed, a keyboard module is assembled with the frame body. Consequently, the keyboard device is manufactured. The protective film includes a sheet-like portion, plural connection portions and plural covering portions. The frame body includes plural spacer structures and plural perforations. The sheet-like portion is fixed on the plural spacer structures. The keyboard module includes a base plate and plural keys. The keycap is penetrated through the corresponding perforation and contacted with the corresponding covering portion.

16 Claims, 11 Drawing Sheets

KEYBOARD DEVICE WITH PROTECTING FUNCTION AND MANUFACTURING METHOD THEREOF

FIELD OF THE INVENTION

The present invention relates to a keyboard device and a manufacturing method of the keyboard device, and more particularly to a keyboard device with a protecting function and a manufacturing method of the keyboard device.

BACKGROUND OF THE INVENTION

As known, computers such as desktop computer (e.g., personal computers) or notebook computers become essential tools for modern people in their daily lives. Moreover, keyboards are important input devices of computers. Via the keyboards, users can input characters or perform control operations.

Generally, a keyboard device comprises plural keys. These keys are classified into some types, e.g., character keys, numeric keys and other associated function key. For example, the keyboard device has a specified key layout, e.g., a standard QWERTY layout. According to the key layout, these keys are located at specified positions of the keyboard device.

A key module of the keyboard device comprises some components or structures, including a keycap, a scissors-type connecting element, an elastic element, a key switch and a base plate. In order to provide the function of allowing the user to press and operate the key, the key is usually designed to have an open-type structure. Due to the open-type structure, plural vacant spaces are formed between the keycap and the base plate. Since foreign matter (dust, liquid or debris) may easily enter the internal portion of the key through these vacant spaces, the components or structures of the key are possibly damaged.

For solving the above problems, a conventional method uses a soft and light-transmissible dustproof cover or protective film to cover the keyboard device. The dustproof cover or protective film is usually made of silicone material. Consequently, the dustproof cover or protective film has the waterproof and dustproof efficacy to prevent the foreign matter from entering the internal portion of the key. However, the use of the dustproof cover or protective film still has some drawbacks. For example, since the dustproof cover or protective film is not completely and tightly attached on the keyboard device, the dustproof cover or protective film is possibly detached from the keyboard device. If the dustproof cover or protective film is detached, the foreign matter may still enter the internal portion of the key. Moreover, since the dustproof cover or protective film is not fixed on the keyboard device to cover the keyboard device, the dustproof cover or protective film is easily slid when the key is pressed by the user. In other words, this design is not user-friendly.

In accordance with another method of solving the above problems, an adhesive unit is formed on a top surface of the keycap. The bottom surface of a covering portion of the dustproof cover or protective film is attached on the corresponding position of the keycap through the adhesive unit. Consequently, the purpose of fixing the dustproof cover or protective film is achieved. However, due to the inherent thickness of the adhesive unit, some problems occur. For example, if the distribution of the adhesive unit on the keycap is not uniform or the thickness of the adhesive unit is too large, the tactile feel of depressing the keycap for the user is adversely affected. Moreover, even if the adhesive unit is made of the light-transmissible material, the character, the symbol or the pattern printed on the keycap is shielded by the adhesive unit. Under this circumstance, the character, the symbol or the pattern printed on the keycap cannot be clearly viewed by the user.

For overcoming the drawbacks of the conventional technologies, there is a need of providing a keyboard device with a protecting function. The dustproof cover or protective film of the keyboard device can effectively prevent the foreign matter from entering the internal portion of the keyboard device and will not hinder the user from pressing and viewing the keys of the keyboard device.

SUMMARY OF THE INVENTION

The present invention provides a keyboard device with a protecting function and a manufacturing method of the keyboard device. The keyboard device is equipped with a protective film to provide a waterproof and dustproof protecting function. By the manufacturing method, the protective film can be securely fixed on a frame body. Consequently, the protective film is not detached.

In accordance with an aspect of the present invention, a keyboard device with a protecting function is provided. The keyboard device includes a protective film, a frame body and a keyboard module. The protective film includes a sheet-like portion, plural connection portions and plural covering portions. The sheet-like portion is arranged between the plural covering portions. The plural connection portions are connected between the sheet-like portion and the plural covering portions. The frame body includes plural spacer structures and plural perforations. The plural perforations are arranged between the plural spacer structures. The plural perforations are respectively aligned with the corresponding covering portions. The sheet-like portion is fixed on spacer top surfaces of the plural spacer structures. The keyboard module is located under the frame body. The keyboard module includes a base plate and plural keys. The plural keys are installed on the base plate. The plural keys are aligned with the corresponding perforations and the corresponding covering portions. Each key includes a keycap. The keycap is penetrated through the corresponding perforation and contacted with the corresponding covering portion. When the keycap is in an undepressed state, the corresponding connection portion and the corresponding covering portion are located at a level higher than the spacer top surface of the corresponding spacer structure.

In accordance with another aspect of the present invention, a manufacturing method of a keyboard device is provided. The manufacturing method includes the following steps. Firstly, a mold is provided. Then, a frame material is placed into the mold to form a frame body, and a film material is placed into the mold to form a protective film. Consequently, the protective film is fixed on the frame body. Then, the mold is removed, and a keyboard module is assembled with a bottom side of the frame body. Consequently, the keyboard device is manufactured. The protective film includes a sheet-like portion, plural connection portions and plural covering portions. The sheet-like portion is arranged between the plural covering portions. The plural connection portions are connected between the sheet-like portion and the plural covering portions. The frame body includes plural spacer structures and plural perforations. The plural perforations are arranged between the plural spacer structures. The plural perforations are respectively aligned with the corresponding covering portions. The sheet-like portion is fixed on spacer top surfaces of the plural spacer structures. The keyboard module includes a base plate and plural keys. The plural keys are installed on the base plate. The plural keys are aligned with the corresponding perforations and the corresponding covering portions. Each key includes a keycap. The keycap is penetrated through the corresponding perforation and contacted with the corresponding covering portion. When the keycap is in an undepressed state, the corresponding connection portion and the corresponding covering portion are located at a level higher than the spacer top surface of the corresponding spacer structure.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
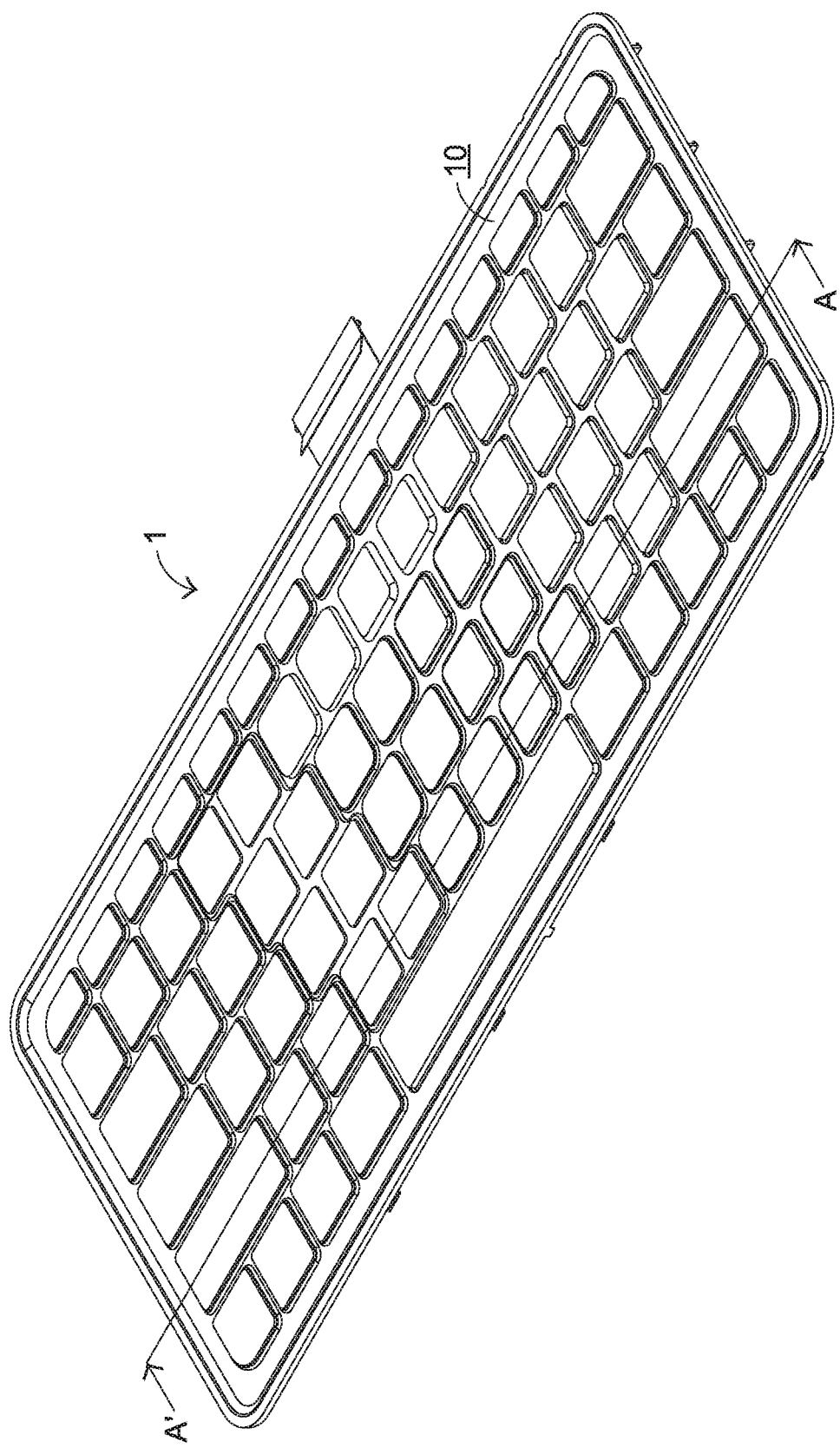
FIG. 1A is a schematic perspective view illustrating the assembled structure of a keyboard device according to an embodiment of the present invention.
Figure 1B:
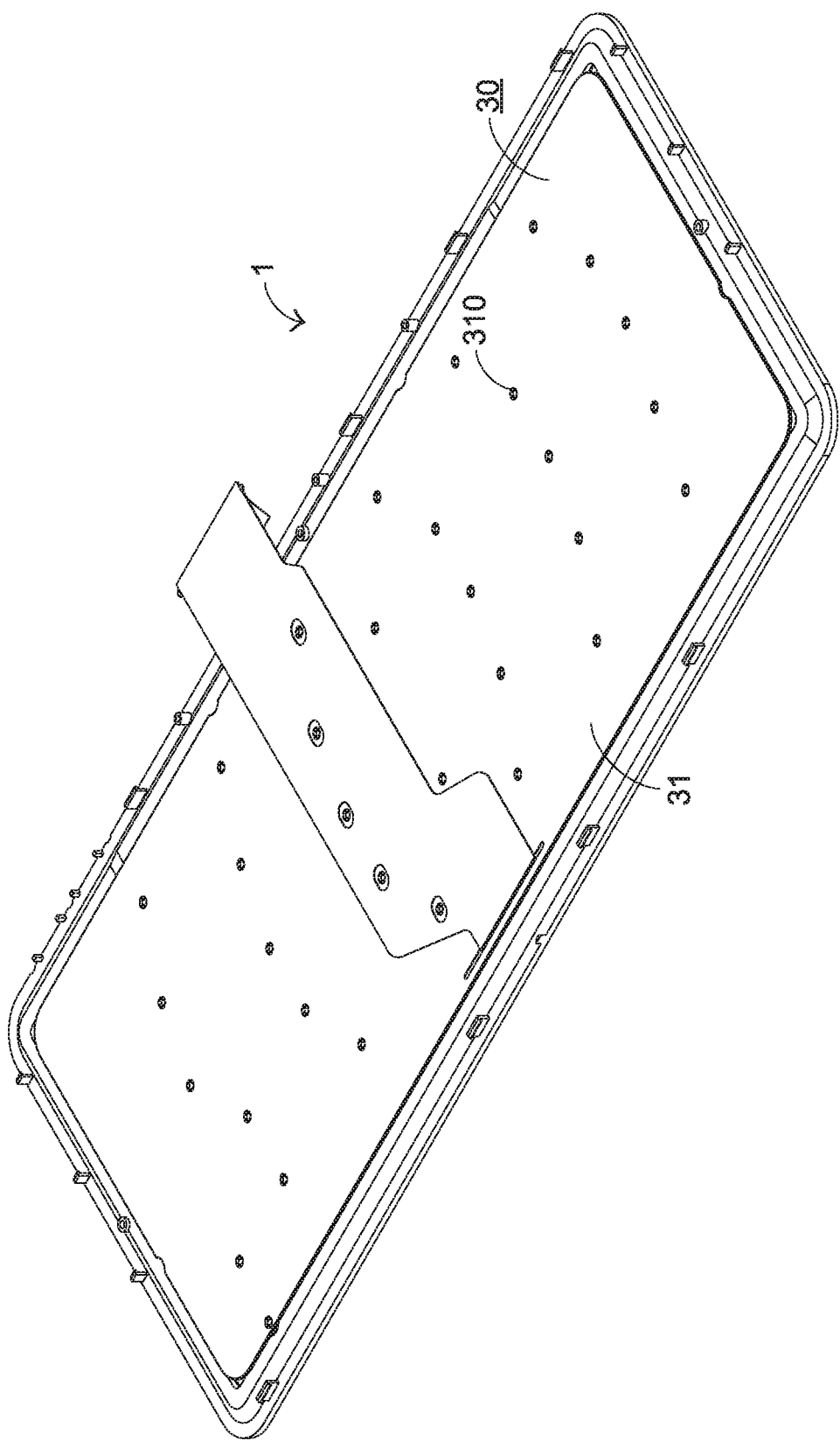
FIG. 1B is a schematic perspective view illustrating the keyboard device as shown in FIG. 1A, in which the keyboard device is laterally rotated by 180 degrees.
Figure 2:
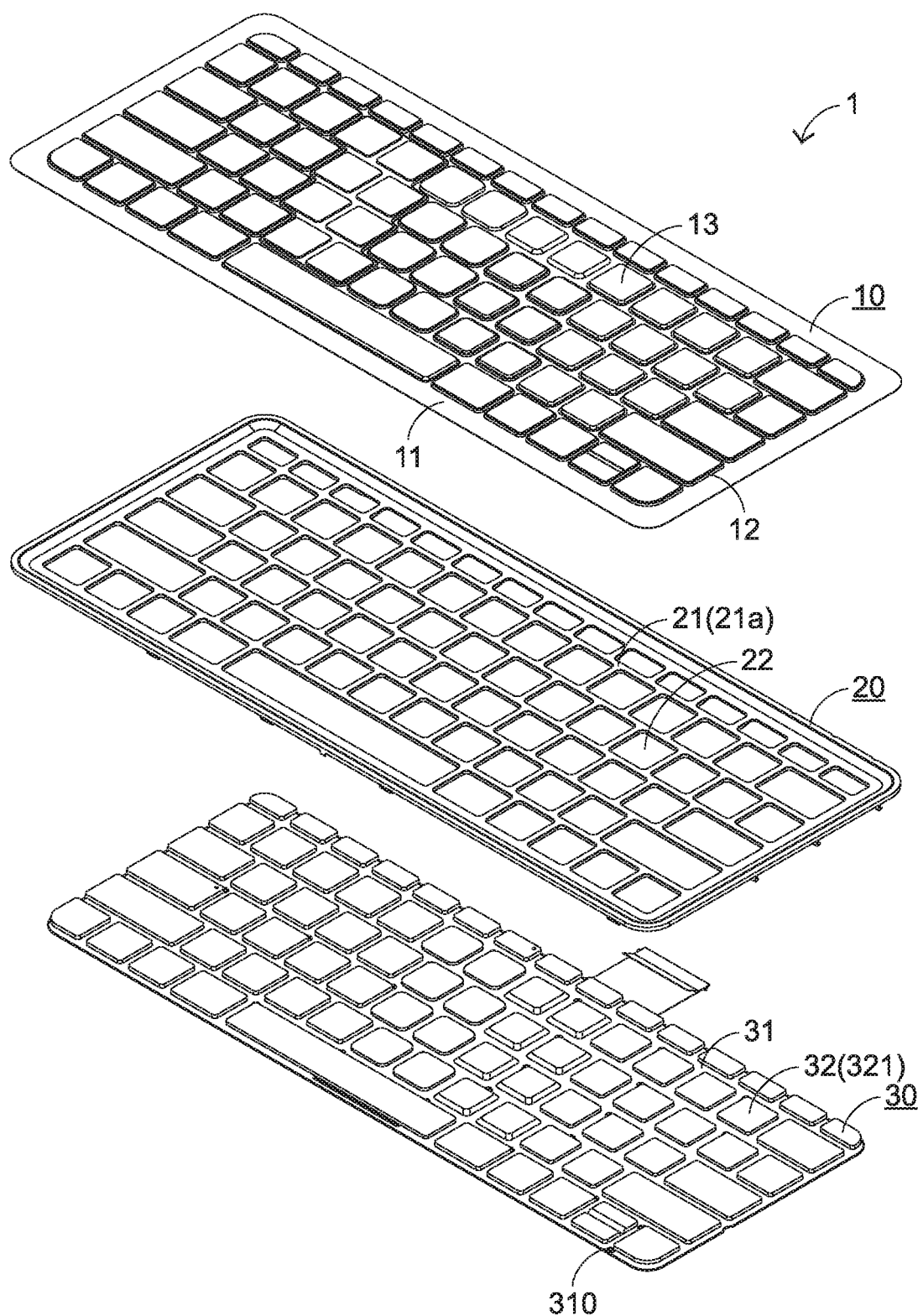
FIG. 2 is a schematic exploded view illustrating the keyboard device as shown in FIG. 1A.

The present invention provides a keyboard device with a protecting function and a manufacturing method of the keyboard device. Please refer to FIGS. 1A, 1B and 2. FIG. 1A is a schematic perspective view illustrating the assembled structure of a keyboard device 1 according to an embodiment of the present invention. FIG. 1B is a schematic perspective view illustrating the keyboard device 1 as shown in FIG. 1A, in which the keyboard device 1 is laterally rotated by 180 degrees. FIG. 2 is a schematic exploded view illustrating the keyboard device 1 as shown in FIG. 1A. In this embodiment, the keyboard device 1 is applied to a computer host. For example, the keyboard device 1 can be used as the keyboard device of a desktop computer (e.g., a personal computer) or used as the keyboard device of a notebook computer.

Please refer to FIGS. 1A, 1B and 2 again. The keyboard device 1 with the protecting function comprises a keyboard module 30, a protective film 10 and a frame body 20. The protective film 10 and the frame body 20 are combined together. The keyboard module 30 is located under the frame body 20 of the combined structure of the protective film 10 and the frame body 20. In this embodiment, the protective film 10 is made of an elastic or deformable material, e.g., silicone or rubber. Consequently, when the protective film 10 is pressed by the user, the protective film 10 can be stretched, bent or compressed. In addition, the use of the protective film 10 can provide the waterproof and dustproof efficacy and enhance the tactile feel. The frame body 20 is made of thermosetting material, e.g., polycarbonate (PC) or plastic material. After the thermosetting material is heated, a designated shape is formed, and the structural strength is sufficiently strong.

In an embodiment, the keyboard module 30 comprises a base plate 31 and plural keys 32. The plural keys 32 are installed on the base plate 31. The structures and the installations of these keys 32 are similar to those of the keys of the conventional keyboard device. That is, each key 32 comprises a keycap, a scissors-type connecting element, an elastic element, a key switch and associated components or structures. In order to highlight the key point of the present invention, only the keycap 321 is shown in the related drawings.

In accordance with a feature of the present invention, the manufacturing method is specially designed. Firstly, the protective film 10 and the frame body 20 are formed, and the protective film 10 and the frame body 20 are combined as a semi-finished product. Then, the semi-finished product is combined with the keyboard module 30. The material of the protective film 10 is relatively softer. However, after the protective film 10 is combined with the frame body 20 with the stronger structural strength, the protective film 10 can be propped up to facilitate the subsequent process of combining the semi-finished product and the keyboard module 30. Afterwards, the keyboard device 1 of the present invention is manufactured.

Figure 3:
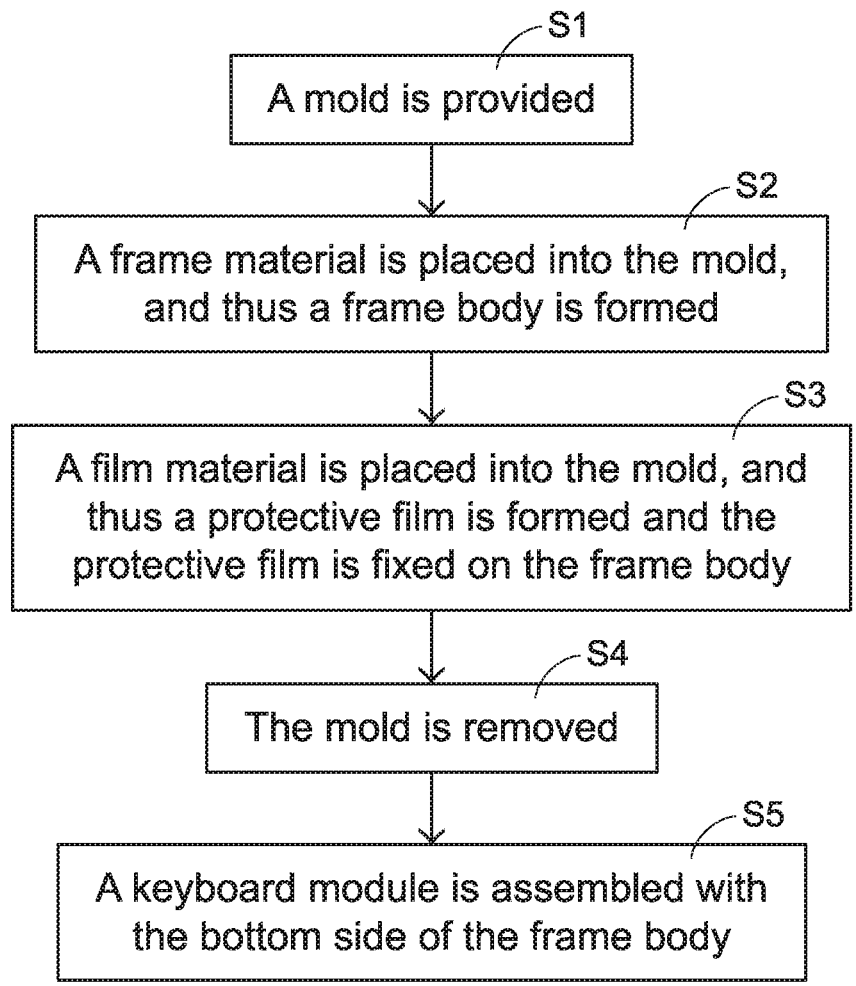
FIG. 3 is a flowchart illustrating a manufacturing method of a keyboard device according to an embodiment of the present invention.
Figure 4A:
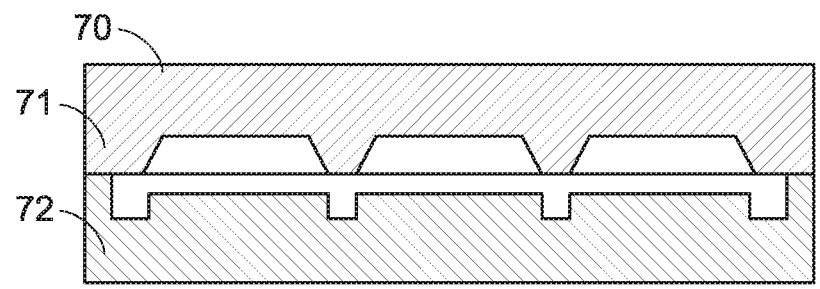
FIGS. 4A to 4D are schematic cross-sectional views illustrating the process of forming the protective film and the frame body.
Figure 4B:
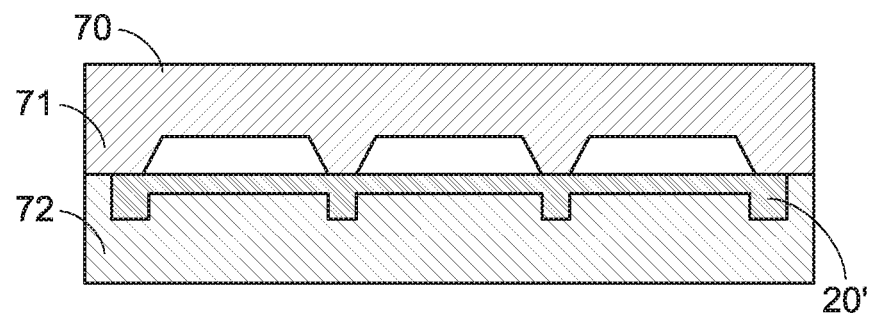
Figure 4C:
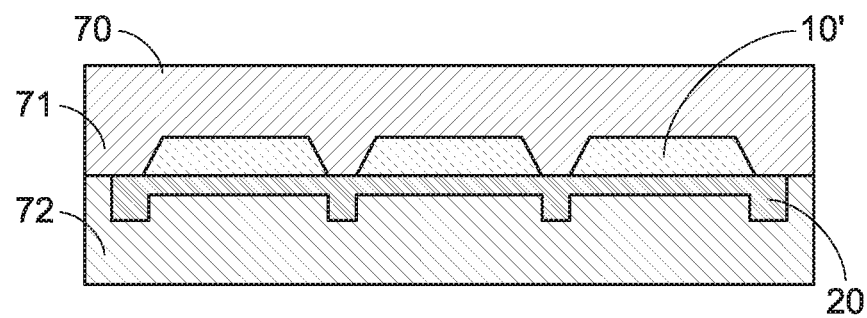
Figure 4D:
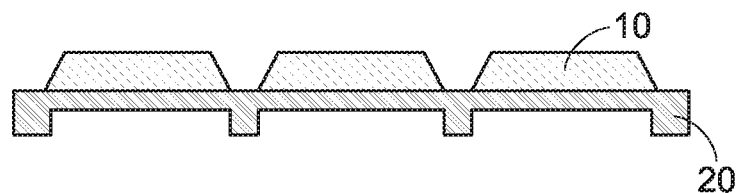
Figure 5:
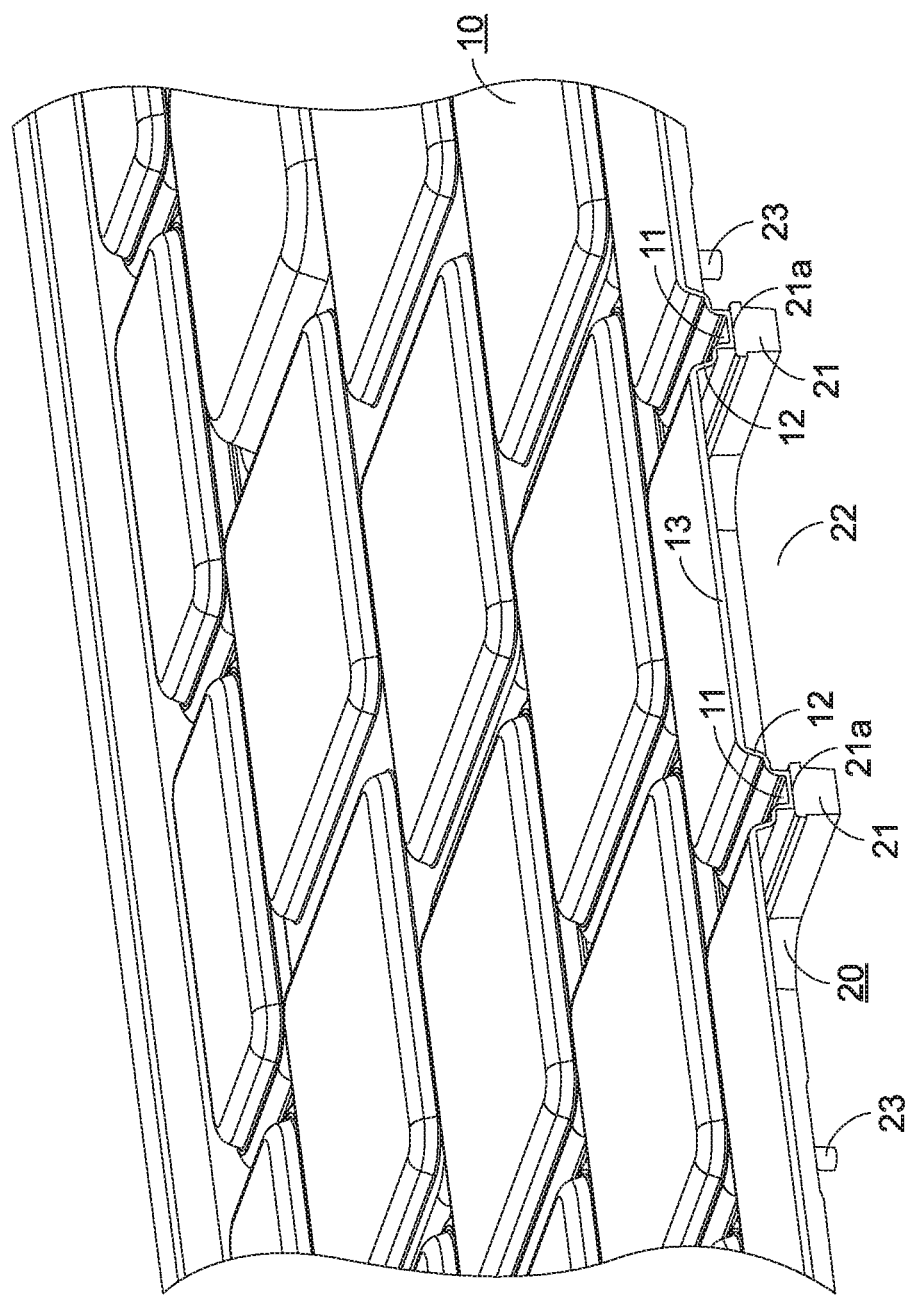
FIG. 5 is a schematic cutaway view illustrating the protective film and the frame body of the keyboard device as shown in FIG. 1A and taken along the line AA'.
Figure 6A:
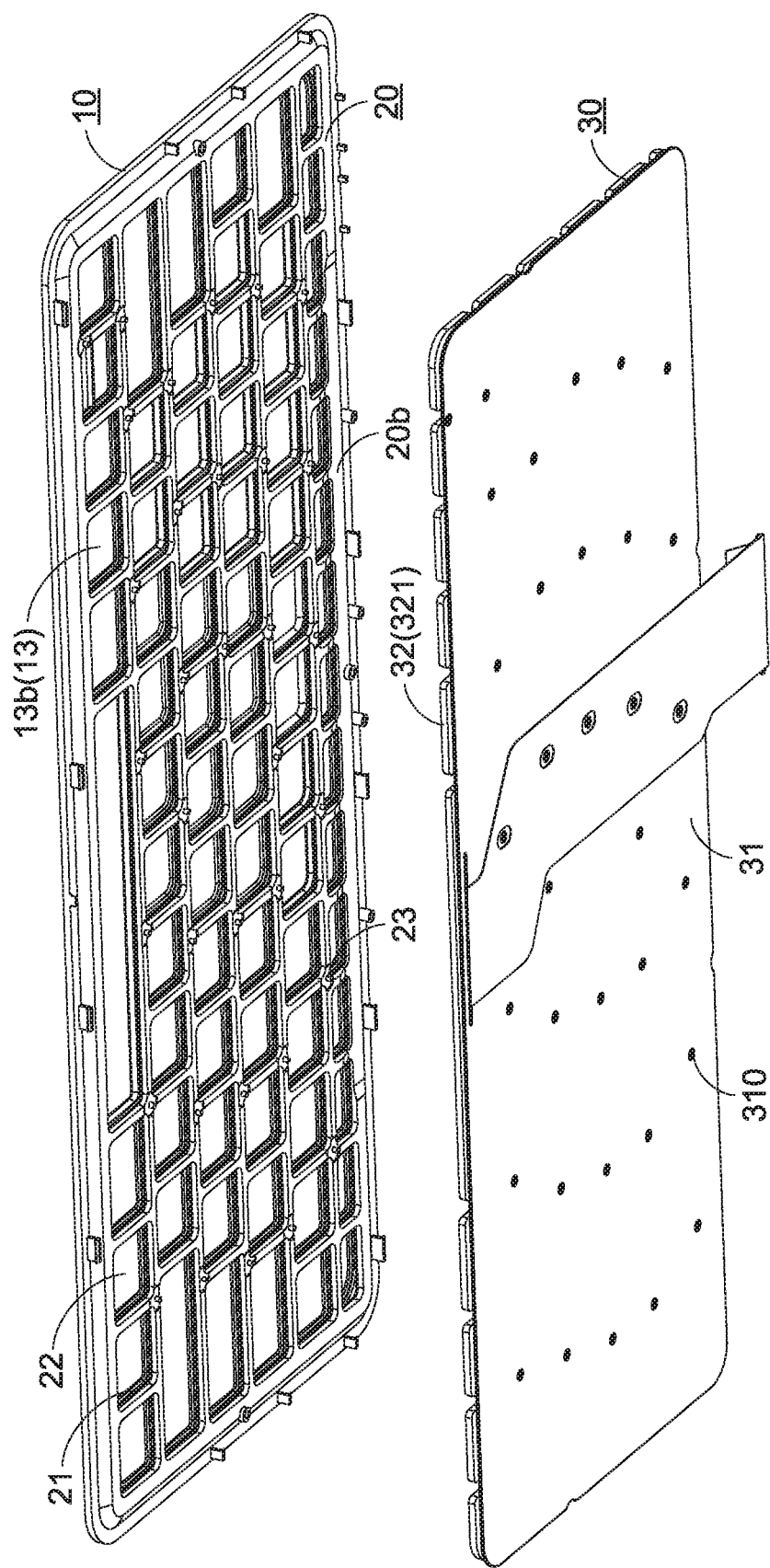
FIG. 6A is a schematic exploded view illustrating the relationship between the combination of the protective film and the frame body and the keyboard module.
Figure 6B:
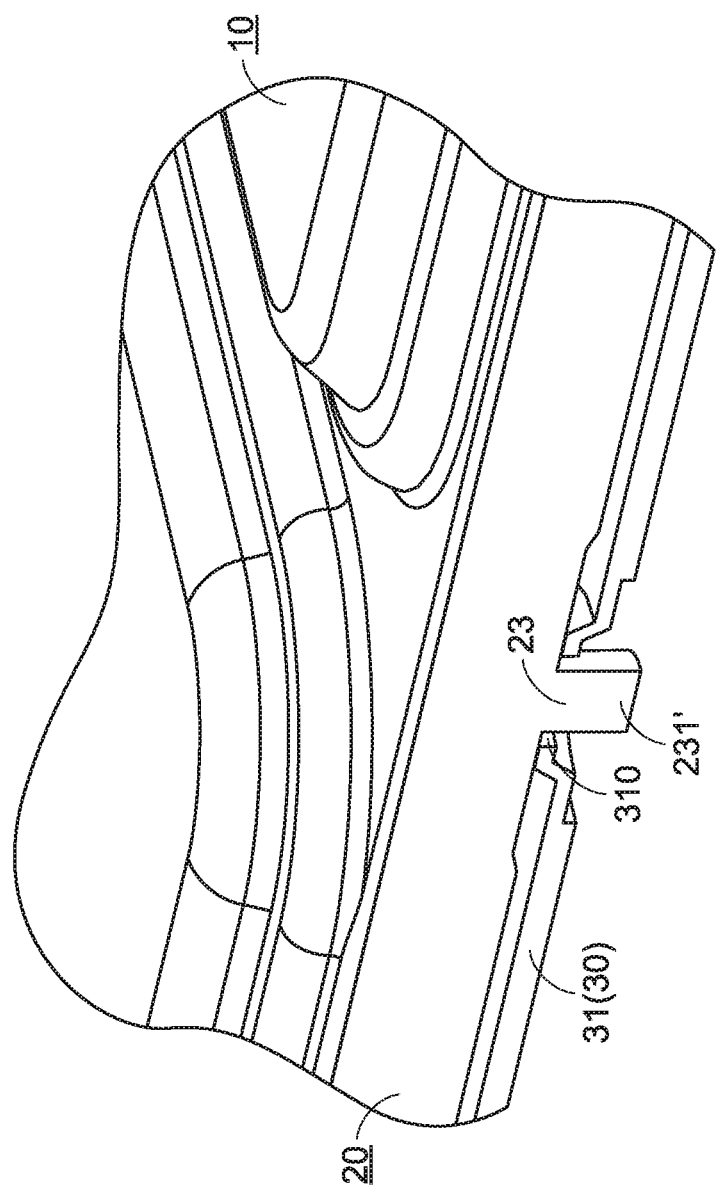
FIG. 6B is a schematic cutaway view illustrating the relationship between the protective film, the frame body and the keyboard module.

Please refer to FIG. 3, FIGS. 4A to 4D, FIG. 5, and FIGS. 6A and 6B. FIG. 3 is a flowchart illustrating a manufacturing method of a keyboard device according to an embodiment of the present invention. FIGS. 4A to 4D are schematic cross-sectional views illustrating the process of forming the protective film 10 and the frame body 20. FIG. 5 is a schematic cutaway view illustrating the protective film 10 and the frame body 20 of the keyboard device 1 as shown in FIG. 1A and taken along the line AA'. FIG. 6A is a schematic exploded view illustrating the relationship between the combination of the protective film 10 and the frame body 20 and the keyboard module 30. FIG. 6B is a schematic cutaway view illustrating the relationship between the protective film 10, the frame body 20 and the keyboard module 30.

Please refer to FIG. 4A. Firstly, a mold 70 is provided (Step S1).

Please refer to FIG. 4B. Then, in a step S2, a frame material 20' is placed into the mold 70. Consequently, a frame body 20 is formed.

Please refer to FIG. 4C. Then, in a step S3, a film material 10' is placed into the mold 70. Consequently, a protective film 10 is formed, and the protective film 10 is fixed on the frame body 20.

Please refer to FIG. 4D. Then, in a step S4, the mold 70 is removed.

Please refer to FIG. 6A. Afterwards, in a step S5, a keyboard module 30 is located under the frame body 20. That is, the keyboard module 30 is assembled with the bottom side of the frame body 20. Consequently, the assembled structure of the keyboard device 1 as shown in FIG. 1A is produced.

In the step S1 of this embodiment, the mold 70 comprises an upper mold part 71 and a lower mold part 72. The structure and the shape of the protective film 10 are defined by the upper mold part 71. The structure and the shape of the frame body 20 are defined by the lower mold part 72.

In the step S2, the frame material 20' is polycarbonate (PC) or plastic material. In this stage, the frame material 20' is in a molten state, and the frame material 20' is permitted to be injected into the mold 70 (especially the lower mold part 72 of the mold 70). Consequently, after a certain cooling time period, the frame body 20 is molded and formed. Moreover, as shown in FIG. 2, the frame body 20 comprises plural spacer structures 21 and plural perforations 22. The plural perforations 22 are arranged between adjacent spacer structures 21.

In the step S3, the film material 10' is silicone or rubber. Similarly, in this stage, the film material 10' is in the molten state, and the film material 10' is permitted to be injected into the mold 70 (especially the upper mold part 71 of the mold 70). Consequently, after a certain cooling time period, the protective film 10 is molded and formed. Moreover, as shown in FIGS. 2 and 5, the protective film 10 comprises a sheet-like portion 11, plural connection portions 12 and plural covering portions 13. The sheet-like portion 11 is arranged between the plural covering portions 13. The plural connection portions 12 are connected between the sheet-like portion 11 and the plural covering portions 13.

In other words, the peripheral region of each covering portion 13 is connected with plural connection portions 12. The sheet-like portion 11 is arranged in the planar distribution manner. These perforations 22 are aligned with the corresponding covering portions 13, respectively. That is, one perforation 22 is aligned with one covering portion 13. Moreover, each covering portion 13 and the corresponding connection portions 12 are collaboratively formed as a hollow protrusion structure. That is, there is an accommodation space under the protrusion structure. The hollow protrusion structure is fixed on the spacer top surfaces 21a of the corresponding spacer structures 21 through the sheet-like portion 11. Consequently, the protective film 10 can be fixed on the frame body 20.

As mentioned above, the protective film 10 is formed on the frame body 20 in an insert molding process. That is, an insert molding process can be performed to form the protective film 10 on the frame body 20 through the mold 70. Consequently, the sheet-like portion 11 can be fixed on the spacer top surfaces 21a of the corresponding spacer structures 21. For example, the insert molding process is an injection molding process or a compression molding process.

In accordance with another feature of the present invention, since the film material 10' in this stage is in the molten state. Consequently, the contact regions between the film material 10' and the frame body 20 (i.e., the contact region between the sheet-like portion 11 and the spacer top surfaces 21a of the spacer structures 21) are compressed in the mold 70 along the vertical direction because of the molten material. In this way, the contact regions between the film material 10' and the frame body 20 are closely combined together. After the film material 10' is cooled down, the protective film 10 is formed and a very strong bonding force between the protective film 10 and the frame body 20 is generated. Due to the strong bonding force, the protective film 10 will not be detached from the frame body 20. Moreover, since no adhesive unit is disposed on the keycap 321 to fix the protective film 10, the problems of the conventional technology that are resulted from the thickness of the adhesive unit or the non-uniform distribution of the adhesive unit will be avoided. Consequently, the tactile feel is not adversely affected.

In the step S5, the keyboard module 30 is designed to match the frame body 20. That is, the size of the keyboard module 30, the installation positions of the keys 32 and the number of the keys 32 match the frame body 20. For example, one key 32 corresponds one perforation 22. Consequently, during the process of assembling the keyboard module 30, the keycaps 321 of the plural keys 32 are penetrated through the corresponding perforations 22 and contacted with the corresponding covering portions 13, and the frame body 20 is placed on the base plate 31.

Please refer to FIGS. 6A and 6B again. In this embodiment, the base plate 31 further comprises plural fixing holes 310, and the frame body 20 comprises a frame bottom surface 20b and plural fixing posts 23. The plural fixing posts 23 are disposed on the frame bottom surface 20b. In addition, the plural fixing posts 23 are aligned with the corresponding fixing holes 310. The positions of the plural fixing posts 23 correspond to the plural fixing holes 310. The number of the plural fixing posts 23 is equal to the number of the plural fixing holes 310. That is, the plural fixing posts 23 and the fixing holes 310 are in a one-to-one relationship. In the embodiment of FIG. 6A, the plural fixing posts 23 are uniformly distributed on the frame bottom surface 20b, and the plural fixing holes 310 are formed in the base plate 31 and at the positions corresponding to the plural fixing posts 23. Consequently, the purpose of securely assembling and fixing the fixing posts 23 and the fixing holes 310 can be achieved.

FIG. 6B is a schematic cutaway view illustrating the connection between one fixing post 23 and the corresponding fixing hole 310. In the embodiment of FIG. 6B, the length of each fixing post 23 is larger than the thickness of the base plate 31. Consequently, after the fixing post 23 is penetrated through the corresponding fixing hole 310, a distal end 231' of the fixing post 23 is exposed outside. In other words, the manufacturing method of the present invention further comprises the steps of penetrating each fixing post 23 through the corresponding fixing hole 310, and thermally melting and pressing the distal end 231' of the fixing post 23, so that the distal end 231' of the fixing post 23 is formed as a fixing end 231 (see FIG. 7C) to fix the corresponding fixing hole 310.

Figure 7A:
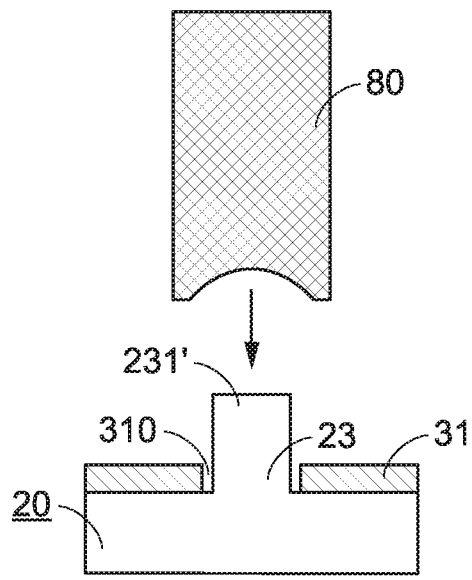
FIGS. 7A, 7B and 7C are schematic cross-sectional views illustrating the steps of installing the base plate of the keyboard module on the frame body.
Figure 7B:
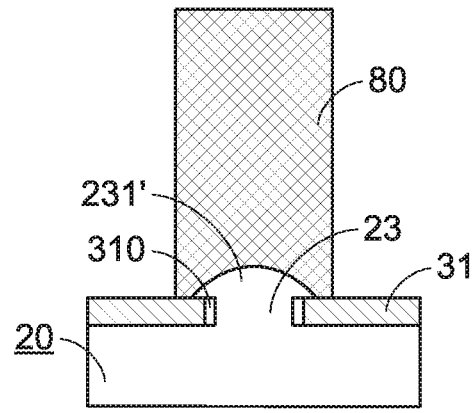
Figure 7C:
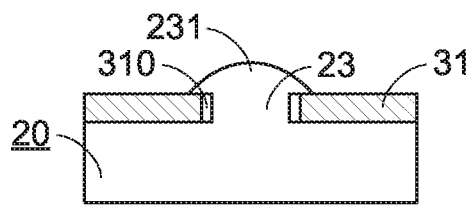

FIGS. 7A, 7B and 7C are schematic cross-sectional views illustrating the steps of installing the base plate 31 of the keyboard module 30 on the frame body 20. In this embodiment, the distal end 231' of each fixing post 23 is machined through a thermal welding and pressing process.

Please refer to FIGS. 7A and 7B. Firstly, a welding head 80 at a high temperature is contacted with the distal end 231' of the fixing post 23. Since the welding head 80 has a specified shape (e.g., a curved shape), the distal end 231' of the fixing post 23 can be thermally molten into the corresponding shape. Moreover, since the base plate 31 is made of metallic material, the use of the thermal welding and pressing process is not detrimental to the components of the base plate 31.

Please refer to FIG. 7C. After the distal end 231' of the fixing post 23 is cooled down, the distal end 231' of the fixing post 23 is thermally set to the specified shape because of the thermosetting material properties. Consequently, the distal end 231' of the fixing post 23 is formed as the fixing end 231. Especially, the width of the fixing end 231 is larger than the diameter of the corresponding fixing hole 310. Consequently, the frame body 20 can be effectively fixed on the base plate 31 and prevented from being detached. Meanwhile, the frame body 20 and the base plate 31 are combined together, and the keyboard device 1 of the present invention is manufactured.

In accordance with another feature of the present invention, the thermosetting material properties of the frame material 20' can be effectively utilized. Consequently, a portion of the frame body 20 can be directly used as a fixing structure (i.e., the fixing post 23 and the fixing end 231), and the frame body 20 can be quickly fixed on and assembled with the base plate 31 through the thermal welding process. In this way, the fabricating cost of the additional fixing elements (e.g., screws) can be effectively saved, and the fabricating time of assembling the fixing materials (or elements) can be reduced.

Figure 8:
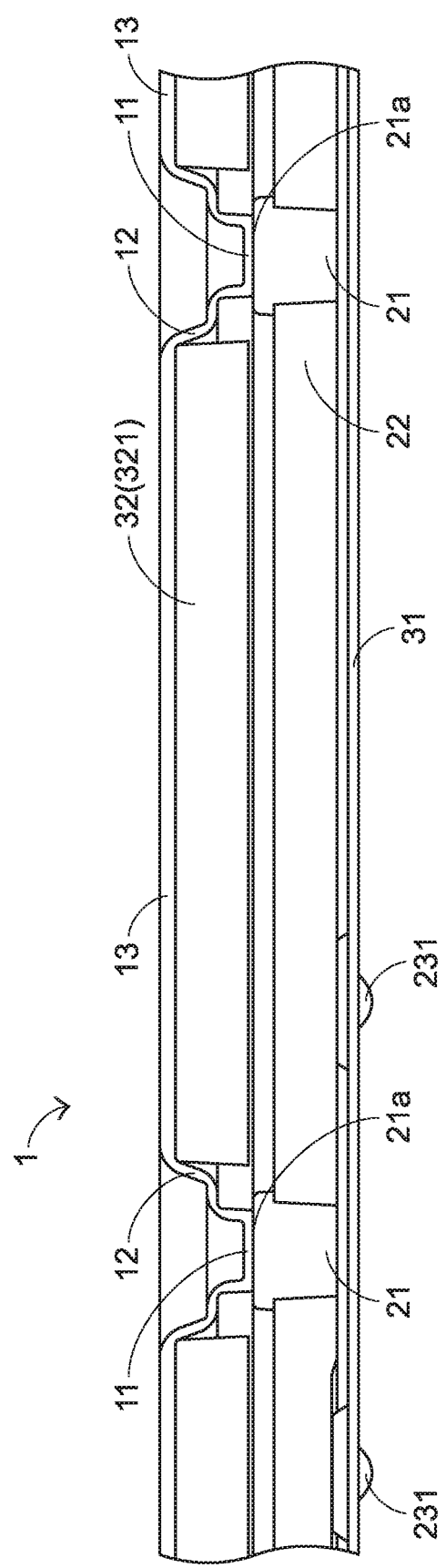
FIG. 8 is a schematic cross-sectional view illustrating a portion of the keyboard device as shown in FIG. 1A and taken along the line AA'.

FIG. 8 is a schematic cross-sectional view illustrating a portion of the keyboard device 1 as shown in FIG. 1A and taken along the line AA'. Please refer to FIGS. 7C and 8. In the assembled keyboard device 1, the frame body 20 comprises plural fixing posts 23 and plural fixing ends 231. The plural fixing posts 23 and the plural fixing ends 231 are aligned with the corresponding fixing holes 310. After the plural fixing posts 23 are penetrated through the corresponding fixing holes 310, the plural fixing ends 231 are used to provide the fixing function. Moreover, one perforation 22 is aligned with one covering portion 13, and one key 32 is aligned with one perforation 22. In other words, the plural keys 32 are aligned with the corresponding perforations 22 and the corresponding covering portions 13. Consequently, the keycaps 321 of the keys 32 are penetrated through the corresponding perforations 22 and contacted with the corresponding covering portions 13.

As shown in FIG. 8, the keycap 321 is in an undepressed state. In this situation, the corresponding connection portions 12 and the corresponding covering portion 13 are located at a level higher than the spacer top surface 21a of the corresponding spacer structure 21. In this embodiment, the connection portion 12 has a stepped structure. Due to the stepped structure, the connection portion 12 can be effectively subjected to the elastic deformation. Consequently, while the keycap 321 is pressed down, the stepped structure of the connection portion 12 can provide a sufficient movable space for the keycap 321. It is noted that numerous modifications and alterations may be made while retaining the teachings of the invention. For example, in another embodiment, the connection portion is designed to have an inclined surface or a curved surface relative to the corresponding covering portion. While the keycap 321 is pressed down, the inclined surface or the curved surface can also provide a sufficient movable space for the keycap 321.

In some embodiments, the manufacturing method of the present invention further comprises a step of forming a character, a symbol or a pattern on a covering bottom surface 13b of each covering portion 13 (see FIG. 6A from the bottom view). In other words, the keycaps 321 of the keys 32 of the keyboard module 30 may have blank top surfaces without any printed content. Since the character, the symbol or the pattern is formed on the covering bottom surface 13b of each covering portion 13, the protective film 10 and the keyboard module 30 can be produced separately. Moreover, since a great number of keyboard modules 30 with the keycaps having blank top surfaces can be reserved to comply with the assembling requirements, the efficacy of managing the keyboard modules 30 is enhanced. Moreover, the contents of the characters, the symbols or the patterns to be printed on the covering bottom surfaces 13b of the covering portions 13 of the protective film 10 can be determined according to the needs of different customers (e.g., the language families or the distribution positions).

As mentioned above, the character, the symbol or the pattern is formed on the covering bottom surface 13b of each covering portion 13. That is, the character, the symbol or the pattern is not formed on the top surface of each keycap 321. Consequently, the drawbacks of the conventional technologies can be overcome. The character, the symbol or the pattern printed on the covering bottom surface 13b is no longer shielded by the thicknesses of the adhesive unit. The character, the symbol or the pattern directly printed on the covering bottom surface 13b can be more clearly viewed by the user. Moreover, the size and the shape of each covering portion 13 match the size and the shape of the keycap 321 of the corresponding key 32. Consequently, even if there is no bonding material between the covering portion 13 and the keycap 321, the covering portion 13 can still shelter the keycap 321 closely. Moreover, since the spacer top surfaces 21a of the corresponding spacer structures 21 are fixed on the sheet-like portion 11, the protective film 10 can be securely fixed on the frame body 20 without slidable detachment. Consequently, the feel of the user to touch the keyboard device is not adversely affected.

It is noted that numerous modifications and alterations may be made while retaining the teachings of the invention. For example, a variant example of the keyboard device will be described as follows.

Figure 9:
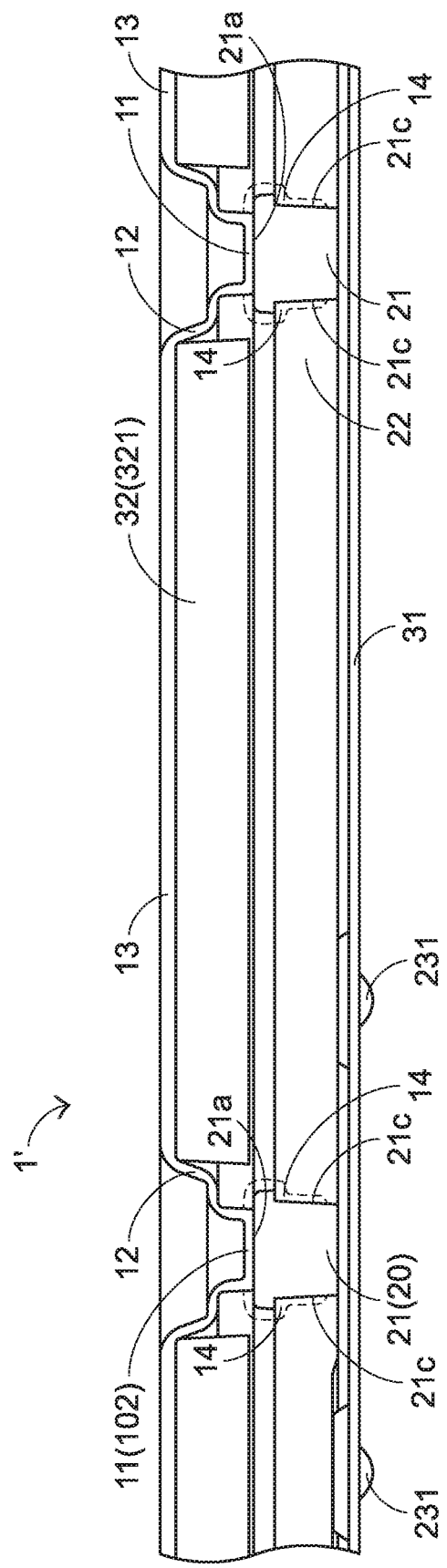
FIG. 9 is a schematic cross-sectional view illustrating a portion of a keyboard device according to another embodiment of the present invention.

FIG. 9 is a schematic cross-sectional view illustrating a portion of a keyboard device 1' according to another embodiment of the present invention. In comparison with the above embodiment, the structure of the protective film 102 in the keyboard device 1' of the present invention is distinguished. Similarly, the sheet-like portion 11 of the protective film 102 is fixed on the spacer top surfaces 21a of the spacer structures 21. Especially, the protective film 102 further comprises plural extension portions 14, which are indicated by dotted lines. The plural extension portions 14 are arranged between the plural connection portions 12 and the sheet-like portion 11. In addition, the plural extension portions 14 are fixed on spacer lateral surfaces 21c of the corresponding spacer structures 21. For succinctness, only two spacer lateral surfaces 21c adjacent to one perforation 22 are shown in the drawing. In fact, there are plural spacer lateral surfaces 21c adjacent to one perforation 22. These extension portions 14 can be fixed on some of the spacer lateral surfaces 21c or all of the spacer lateral surfaces 21c.

Due to the arrangement of the extension portions 14, the adhesion force between the protective film 102 and the frame body 20 can be increased and the possibility of detaching the protective film 102 from the frame body 20 will be minimized. However, since the extension portions 14 are inserted downwardly into the perforations 22 of the frame body 20, the mold for forming the protective film 102 with the extension portions 14 should be designed more exquisitely. Consequently, after the film material is injected into the mold, a portion of the film material flows downwardly to be in contact with the formed frame body 20.

From the above descriptions, the present invention provides a keyboard device with a protecting function and a manufacturing method of the keyboard device. In comparison with the conventional technologies, the keyboard device and the manufacturing method of the present invention have the following benefits. Firstly, the protective film and the frame body are combined as a semi-finished product that is easily assembled and reserved, and then the semi-finished product is combined with the keyboard module. Secondly, the protective film and the frame body are formed through an insert molding process. In comparison with the conventional technology of using the adhesive unit, the protective film and the frame body can be combined together more securely. Consequently, the combination of the protective film and the frame body has the waterproof and dustproof efficacy and is not subjected to slidable detachment. Thirdly, since no adhesive unit is disposed on the keycap according to the present invention, the tactile feel of depressing the keycap is not adversely affected. Fourthly, the uses of the fixing posts of the frame body to directly assemble the frame body with the keyboard module can save the additional fabricating cost of the fixing material. Fifthly, since the characters, the symbols or the patterns are directly printed on the covering bottom surfaces of the covering portions, the characters, the symbols or the patterns can be clearly viewed by the user.

In other words, the keyboard device of the present invention is capable of effectively overcoming the drawbacks of the conventional technologies and achieving the purposes of the present invention.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device with a protecting function, the keyboard device comprising:
    a protective film comprising a sheet-like portion, plural connection portions and plural covering portions, wherein the sheet-like portion is arranged between the plural covering portions, and the plural connection portions are connected between the sheet-like portion and the plural covering portions;
    a frame body comprising plural spacer structures and plural perforations, wherein the plural perforations are arranged between the plural spacer structures, the plural perforations are respectively aligned with the corresponding covering portions, and the sheet-like portion is fixed on spacer top surfaces of the plural spacer structures; and
    a keyboard module located under the frame body, and comprising a base plate and plural keys, wherein the plural keys are installed on the base plate, and the plural keys are aligned with the corresponding perforations and the corresponding covering portions, wherein each key comprises a keycap, and the keycap is penetrated through the corresponding perforation and contacted with the corresponding covering portion,
    wherein when the keycap is in an undepressed state, the corresponding connection portion and the corresponding covering portion are located at a level higher than the spacer top surface of the corresponding spacer structure.

2. The keyboard device according to claim 1, wherein the base plate comprises plural fixing holes, and the frame body comprises a frame bottom surface, plural fixing posts and plural fixing ends, wherein the plural fixing posts are disposed on the frame bottom surface, the plural fixing ends are formed on the corresponding fixing posts, and the plural fixing posts and the plural fixing ends are aligned with the corresponding fixing holes, wherein the plural fixing posts are penetrated through the corresponding fixing holes, and the plural fixing posts are fixed in the corresponding fixing holes through the corresponding fixing ends.

3. The keyboard device according to claim 1, wherein the protective film comprises plural extension portions, wherein the plural extension portions are arranged between the plural connection portions and the sheet-like portion, and the plural extension portions are fixed on at least one spacer lateral surface of each the spacer structure.

4. The keyboard device according to claim 1, wherein the protective film is formed on the frame body by an insert molding process, so that the sheet-like portion is fixed on the spacer top surfaces of the spacer structures, wherein the insert molding process is an injection molding process or a compression molding process.

5. The keyboard device according to claim 1, wherein each connection portion has a stepped structure, or each connection portion has an inclined surface or a curved surface relative to the corresponding covering portion.

6. The keyboard device according to claim 1, wherein a character, a symbol or a pattern corresponding to each key is formed on a covering bottom surface of the corresponding covering portion.

7. The keyboard device according to claim 1, wherein a size and a shape of each covering portion match a size and a shape of the keycap of the corresponding key.

8. The keyboard device according to claim 1, wherein the protective film is made of silicone or rubber, and the frame body is made of polycarbonate (PC) or plastic material.

9. A manufacturing method of a keyboard device, the manufacturing method comprising steps of:
    providing a mold;
    placing a frame material into the mold to form a frame body, and placing a film material into the mold to form a protective film, so that the protective film is fixed on the frame body; and
    removing the mold, and assembling a keyboard module with a bottom side of the frame body, so that the keyboard device is manufactured,
    wherein the protective film comprises a sheet-like portion, plural connection portions and plural covering portions, wherein the sheet-like portion is arranged between the plural covering portions, and the plural connection portions are connected between the sheet-like portion and the plural covering portions,
    wherein the frame body comprises plural spacer structures and plural perforations, wherein the plural perforations are arranged between the plural spacer structures, the plural perforations are respectively aligned with the corresponding covering portions, and the sheet-like portion is fixed on spacer top surfaces of the plural spacer structures, wherein the keyboard module comprises a base plate and plural keys, wherein the plural keys are installed on the base plate, and the plural keys are aligned with the corresponding perforations and the corresponding covering portions, wherein each key comprises a keycap, and the keycap is penetrated through the corresponding perforation and contacted with the corresponding covering portion, wherein when the keycap is in an undepressed state, the corresponding connection portion and the corresponding covering portion are located at a level higher than the spacer top surface of the corresponding spacer structure.

10. The manufacturing method according to claim 9, wherein the base plate comprises plural fixing holes, and the frame body comprises a frame bottom surface and plural fixing posts, wherein the plural fixing posts are disposed on the frame bottom surface, and the plural fixing posts are aligned with the corresponding fixing holes, wherein the manufacturing method further comprises steps of:

allowing the plural fixing posts to be penetrated through the corresponding fixing holes; and thermally melting and pressing a distal end of each fixing post, so that the distal end of the fixing post is formed as a fixing end, wherein the fixing post is fixed in the corresponding fixing hole through the fixing end.

11. The manufacturing method according to claim 9, wherein the protective film comprises plural extension portions, wherein the plural extension portions are arranged between the plural connection portions and the sheet-like portion, and the plural extension portions are fixed on at least one spacer lateral surface of each the spacer structure.

12. The manufacturing method according to claim 9, wherein the protective film is formed on the frame body by an insert molding process, so that the sheet-like portion is fixed on the spacer top surfaces of the spacer structures, wherein the insert molding process is an injection molding process or a compression molding process.

13. The manufacturing method according to claim 9, wherein each connection portion has a stepped structure, or each connection portion has an inclined surface or a curved surface relative to the corresponding covering portion.

14. The manufacturing method according to claim 9, further comprising a step of forming a character, a symbol or a pattern corresponding to each key on a covering bottom surface of the corresponding covering portion.

15. The manufacturing method according to claim 9, wherein a size and a shape of each covering portion match a size and a shape of the keycap of the corresponding key.

16. The manufacturing method according to claim 9, wherein the film material is silicone or rubber, and the frame material is polycarbonate (PC) or plastic material.

\* \* \* \* \*